Nov. 15, 1966  H. MILLER  3,285,146
WOOD PAVING ELEMENTS AND SURFACES PAVED THEREWITH
Filed Jan. 20, 1964  2 Sheets-Sheet 1
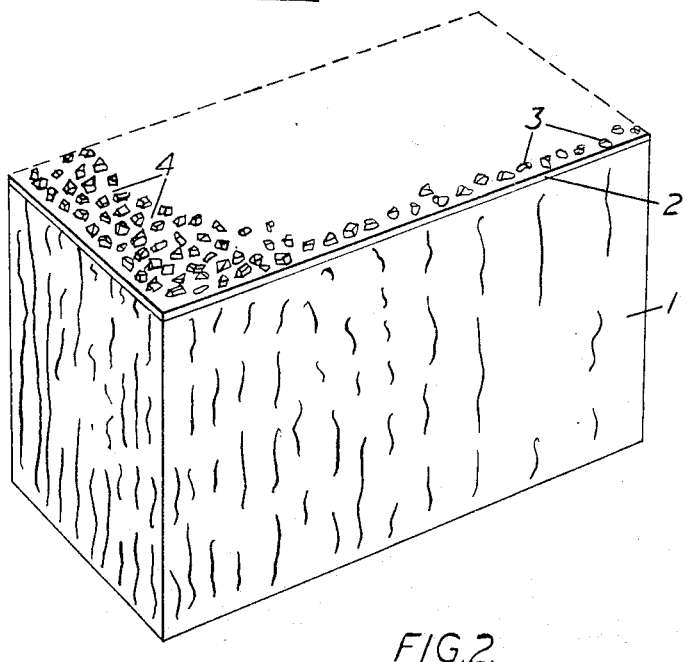
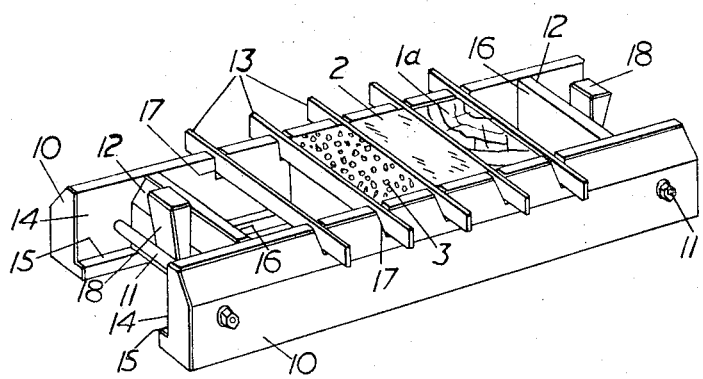
Inventor
HENRY MILLER
By Smith & Smiley
Attorneys Nov. 15, 1966         H. MILLER         3,285,146
WOOD PAVING ELEMENTS AND SURFACES PAVED THEREWITH
Filed Jan. 20, 1964                           2 Sheets-Sheet 2

Inventor
HENRY MILLER

By *Imirie + Smiley*
Attorneys

# United States Patent Office 3,285,146
Patented Nov. 15, 1966

3,285,146
WOOD PAVING ELEMENTS AND SURFACES PAVED THEREWITH
Henry Miller, London, England, assignor to Acmeflooring Limited, Barking, England, a British company
Filed Jan. 20, 1964, Ser. No. 338,774
10 Claims. (Cl. 94—15)

This invention relates to wood paving elements for, for example, carriageways, aircraft runways, bridge decks, footpaths, stair-treads, factory floors or the like requiring a durable non-skid or non-slip surface ready for use almost immediately after the paved surface is laid and to the construction of carriageways and other surfaces paved with the said elements.

One object of the invention is the provision of a wood-paving element having a factory-applied durable non-skid or non-slip channelled surface.

Paving elements according to the invention are usually of parallelopipedic form of any suitable dimensions. As to dimensions, their length may, for example, be of the order of twice their width, their thickness or depth being about equal to their width, the elements then being conventionally identifiable as "blocks"; or their length may, for example, be considerably greater than their width and/or their thickness, the elements then being conventionally identifiable as strips, beams or panels. A typical but non-limitative block size would be about five inches in depth, four inches in width and nine inches in length. Typical uses of such blocks would be the paving of surfaces such as carriageways, roads or bridge decks. Typical but non-limitative strip or beam sizes would be from three inches to twelve inches in depth, from five to fifteen inches in width and up to nine feet in length. Typical but non-limitative panel sizes would be ten inches to three feet in width, one eighth of an inch to six inches in depth and four feet to nine feet in length. Typical uses of such strips, beams or panels would include use as railway sleepers, and the paving of surfaces such as railway crossings and factory floors.

A paving element according to the invention comprises a body part of wood, said body part having a substantially plane face, a hard, strongly adhesive layer of a cured epoxide resin, adhered to a face thereof and a quantity of stones comprising relatively spaced chippings of calcined bauxite embedded in the layer for substantially the full thickness thereof, the stones having a height greater than the thickness of the layer so that the upper part of each stone projects from the layer, the projecting parts of the relatively spaced stones and the top surface of the layer defining intercommunicating channels. The epoxide "layer" is a resin layer of a hard water impermeable product produced by curing a synthetic epoxide resin (which may or may not have a filler admixed with it) in the presence of a hardener.

The invention also resides in a method of providing a face of a wood paving element with an anti-skid, protective, channelled wearing surface, which method comprises applying to said face a layer comprising a hardenable synthetic epoxide resin, embedding in relatively spaced relation in said layer for substantially the full thickness thereof stones comprising chippings of calcined bauxite, and curing the layer to the hardened condition, said chippings having a height greater than the thickness of said layer whereby the upper part of each chipping projects from the layer and the relatively spaced projecting parts of the chippings and the top surface of the layer define intercommunicating channels in said wearing surface.

By "hardenable synthetic epoxide resin" is meant a synthetic epoxide resin which can, by the use of hardeners (by which term is meant compounds which, when mixed with the resin in question, cause it to harden) be converted or cured to a hard water impermeable mass and which will, if cured in the form of a layer applied to a face of a wood body, strongly adhere to the body in the cured or hardened condition, the synthetic resin having a pot life that is at least long enough to enable a layer of the resin to be laid on the body and for stones of calcined bauxite to be embedded in the layer.

By "pot life" is meant, in relation to synthetic epoxy resin, the period of time between the time when one starts off the curing process by addition of a hardener, and the time when the resin, or hardening, becomes too viscous to work.

By "chippings of calcined bauxite" is meant relatively small pieces of this material suitable for dressing roadways.

It is advantageous to have the stones or chippings of approximately the same size, having a variation in diameter in the order of up to plus or minus 10 percent of the medium size (although it will be appreciated that this description does not exclude chippings having a relative variation in size such as may be found in the stone size range that is referred to in the industry as ¼"/³⁄₁₆").

The "chippings" are to be differentiated from granules of sand. Sand granules are of small order of size compared with chippings suitable for use in carrying out the present invention. The purpose of the chippings used in the present invention is threefold. First to provide an ant-skid surface roughly comparable with that of a very coarse rasp, secondly to provide a hard wearing surface and thirdly and of great importance for, for example, a factory floor where oil or chemicals are spilled, to ensure the provision of intercommunicating channels of sufficient capacity to receive the spilled liquid whilst leaving the tops of the chippings free to perform their anti-skid functions. Granules of the sizes which make up "sand" would be totally unsuitable for the purpose of the invention because the depth of any intercommunicating channels which might be formed in a surface comprising such granules partly embedded in a base layer would be wholly inadequate to accommodate spilled liquid, to permit it to spread freely throughout the channels and so leave the peaks of the granules exposed.

The chippings must have the qualities of skid-resistance and resistance to wear and to polishing. Tests have shown that chippings of calcined bauxite are outstanding as regards these qualities.

The chippings, because of their coarseness in relation to sand particles and because they project from the layer in which their lower parts are embedded by a distance sufficient to produce well defined channels, require that the said layer be such as firmly to hold them when, for example, lateral stresses are imposed on the projecting parts. Hard epoxy resin has been found to be eminently suitable for this purpose; and such resin has the additional properties of extremely strong adhesion to the wood body and of preserving the surface of the wood body coated with the resin from attack by water and many chemicals.

Preferably the method includes applying the layer to an end grain face of the wood body. It may include mixing a filler with the resin before applying it to the face of the body. It may also include applying a roller to the stones embedded in the layer before the curing step to ensure that they are embedded to the full depth of the layer. Mould walls may be provide, the mould wall surrounding the block and projecting above its upper surface by an amount equal to the thickness of the desired layer, and the resin or the resin mixture may be applied to fill the cavity defined by the projecting portions of the mould walls and the face of the wood body by trowelling. The wood body may be treated with creosote or other preservative prior to having the layer applied.

Epoxy resins constitute a well known class of organic resins having groups or rings of the formula

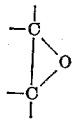

present in the molecules. Such resins will react with (or to use the term commonly used in the art, are "cured" by) "hardeners," which are compounds (e.g., certain amines) which cause some at least of the

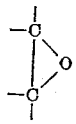

rings to be opened with the result that cross-linkaging occurs between the molecules. The term "synthetic epoxy resin" where used in this specification and the claims thereof means a synthetic organic epoxy resin which (either alone or mixed with a filler) will give a hard, water impermeable product when reacted with or cured by a suitable hardener. A suitable "hardener" is a hardener which, with the synthetic epoxy resin in question, will give a mixture having a pot life that is at least long enough to enable a layer comprising the resin to be laid on a block and for chippings of calcined bauxite to be embedded in the layer, and which will cause the resin in question to harden or cure to give a hard, water impermeable product that will adhere to a wood block.

A synthetic epoxy resin suitable for use in the working of the present invention would be the product obtained from the reaction of a biphenol with epichlorhydrin. As is well known, the viscosity of such a resin will depend upon the proportions of biphenol and epichlorhydrin in the reaction: in general, an increase in the proportion of biphenol present results in a resin of increased viscosity. As indicated below, good results are obtained when the epoxy resin has a resin viscosity of 4,000 to 15,000 centipoises and an average molecular weight of from 350 to 400. Diethylene triamine is an example of a suitable hardener.

A plurality of strips or beams according to the invention may be secured together in relatively spaced relation on battens to provide a prefabricated paving unit permitting the said plurality of strips or beams to be laid in a single operation on the site, e.g., a railway crossing or a factory floor, where they are required for use.

Preferably, when the paving element is of block-like form the layer is applied to an end grain surface of the body. When the element is of strip, beam or panel form the grain preferably runs lengthwise of the wood body and the layer is applied to a longitudinal grain face thereof.

Conveniently, the stones or chippings in elements according to the invention have a minimum dimension substantially double the thickness of the layer, so that approximately half the thickness of each stone is embedded in, and held by, the resin.

The invention will now be described with reference to the accompanying drawings, wherein—

FIGURE 1 is a perspective view of a wood paving element, of block-like form, according to the invention;

FIGURE 2 is a perspective view of an example of a table jig for making elements like those shown in FIGURE 1, the view including elements in various stages of manufacture;

Figure 3:
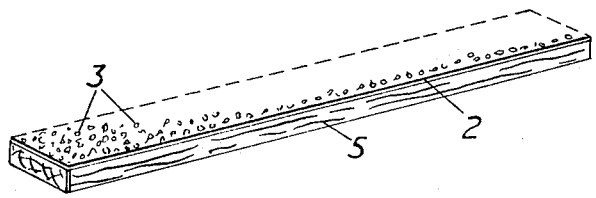
FIGURE 3 is a perspective view of a wood paving element, of beam-like form, according to the invention.

The elements shown in the drawings are of substantially parallelopipedic form. The element shown in FIGURE 1 comprises a wood body or block 1 (which may, if desired, be initially treated with creosote or other preservative) to the upper surface of which, preferably an end grain surface, a layer comprising a synthetic epoxide resin, which may be mixed with a filler, is applied. The filler may consist of or may comprise sand, finely divided powdered silica or mica, wooddust, ash from solid fuel boilers or other finely divided material.

Conveniently, the layer 2 is about one-eighth of an inch thick and the resin is mixed with a hardener so that it will be cured at room temperature.

After the layer 2 has been applied and before it has hardened appreciably a predetermined quantity of stones 3, of hard material, is distributed substantially uniformly over the surface of the layer 2 and is lightly rolled into the layer 2, so that each stone is embedded in and is firmly gripped by the resin of the layer. The quantity of stones is chosen to leave clearly defined spaces 4 therebetween.

The stones 3 consist of calcined bauxite. For use with a layer 2 having a thickness of one-eighth of an inch the stones may conveniently be of the size known in the trade as 1/4"/1/16". Thus the thickness of the layer 2 is about one half the dimension of the stones.

In the manufacture of the element the resin layer 2, mixed with a filler if such is used, may, when the nature of the resin so permits, be applied to the face of the wood body 1 by hand trowelling or by machine. During the application of the resin layer 2, the upper part at least of each body is preferably surrounded by mould walls which project above the top face of the body by an amount corresponding to the required thickness of the resin layer. The resin may be thyxotropic so that it retains its shape even if the mould walls are removed before the layer 2 has hardened. A suitable method of applying the resin by machine comprises passing the bodies on a conveyor beneath an elongated opening extending transversely of the direction of travel of the bodies, the resin being discharged through the opening, each body being surrounded at least at its upper part by mould walls as previously described, and a scraper may be employed resting on the top edges of the mould walls to scrape off resin in excess of the required thickness.

As previously stated, FIGURE 2 shows a jig for use in applying the resin layer to the wood bodies of FIGURE 1. The jig comprises two longitudinal bars 10 joined together by cross bolts 11 near the ends of the bars, transverse presser plates 12 near the bolts and cross spacers 13 between the presser plates. The bars 10 have plane vertical faces 14 opposite to each other and each has at the bottom of its plane face a step 15 directed towards the step on the opposite bar. The presser plates 12 have plane vertical faces 16 directed towards each other, said plates 12 resting on the steps 15 and having a height such that their top edges are flush with the top edges of the bars 10. The spacers 13 are equally spaced; they are removably held in slots 17 in the top edges of the bars. The slots have a depth such that the top edges of the spacers are flush with the top edges of elements 10 and 12 and a width, considered in the lengthwise direction of the bars, such that the spacers, when in them, have limited movement towards one end or the other of the bars 10. Wedges 18 located between the respective bolts 11 and the adjacent presser plates 12 urge the presser plates towards the spacers when the wedges are forced down. Normally the distance between each presser plate and the spacer nearest to it is a little greater than the distance between any two imediately successive spacers.

At the commencement of the manufacturing procedure of an element according to the invention the wedges and the spacers are removed from the jig. A wood body or block having a height equal to the depth of the plane faces 14 minus the thickness of the layer of the hardenable synthetic resin to be applied to a face of the block, having a length almost equal to the width of the space between the said faces and a width almost equal to the mean distance between the spacers is laid against the plane face of one of the presser plates so as to rest on the steps 15. A spacer 13 is then inserted into the grooves 17 nearest to the wood body, another wood body of similar size to the first is laid against the said spacer so as to rest on the steps, a spacer is then introduced into the vacant grooves nearest to the second wood body, and so on until the jig is filled with similar wood bodies. The wedges 18 are then driven down to cause the presser plates to thrust the wood bodies against the spacers. At this stage the top faces of the wood bodies lie a short distance below the top plane of the jig; the drawing shows one wood body with its face 1a so located. A hardenable synthetic resin layer is then applied to the top faces of the wood bodies and trowelled or otherwise worked flush with the top plane of the jig, (one such layer is indicated by 2 in this figure), the chippings are then applied to the resin whilst it is in its uncured state and are pressed into the resin. A wood body provided with such chippings 3 is shown in this figure. The jig and wood bodies in it are then set aside to allow the resin to cure. Thereafter the wedges and spacers, and then the wood bodies, ready for use when required, are removed from the jig.

The stones or chippings may be applied by hand or by machine. In the latter case the wood bodies with their resin layers are passed on a conveyor beneath an elongated opening before the layer 2 hardens, the opening for the stones extending transversely of the direction of travel of the wood bodies and the stones being discharged at a regulated rate through the opening, having regard to the quantity of stones it is desired to apply to the individual bodies. After the stones have been applied, the wood bodies pass beneath a roller, or a roller is run over the stones in order to embed the lower parts of the stones in the resin to the full depth of the layer 2. The wood bodies are, as previously stated, then set aside for the appropriate curing period for the particular resin or mixture, which of course may be varied by altering the resin: hardener ratio, or else they are baked where the resin is thermosetting resin or is of the kind that is mixed with a hardener so that the mixture will cure satisfactorily only on heating. A typical and convenient hardening time is two hours.

The element shown in FIGURE 3 comprises a wood body 5, equivalent to the body 1, FIGURE 1 (save the grain of body 5 runs lengthwise of the body and the body is much longer than it is wide or thick), a layer 2 of hard synthetic epoxide resin applied to a longitudinal grain face of the wood body, and chippings 3 of calcined bauxite embedded for about half their height in the layer 2 which is about equal to half the height of the chippings, the chippings being spaced apart relatively. As in the case of FIGURE 1 a suitable layer thickness is one-eighth of an inch. The element of FIGURE 3 may be made in a jig and by a method substantially as described with reference to FIGURE 2.

The unit shown in FIGURE 3 comprises a number of relatively spaced parallel elements or boards 5 faced with resin and chippings on their top surface as described with reference to FIGURE 2, said boards being secured to battens 7 at their undersurface by bolts, nails or the like, not shown. The spacing is to permit of expansion of the boards. A typical unit is nine feet long and about three feet wide.

Experiments made in the manufacture of wood paving elements according to the invention indicate that the best results are obtained with an epoxide or epoxy resin or with a mixture of epoxy resins with characteristics falling within the limits given under Example I, below. The resins when cured should have a high degree of hardness, strength, wear resistance and tenacity as regards their adhesion to the wood body and to the road stones. It is advantageous to use resins which are curable at room temperature.

Example I

Resin viscosity _____ centipoises__ 4,000 to 15,000
Average molecular weight _____ 350 to 400
Epoxide equivalent _____ 175 to 210

The hardening or curing agent may be a primary or a secondary amine, for example, di-ethylene-tri-amine, with a molecular weight of 103.

Where a filler is used, as described above, convenient mixes are given in Examples II and III.

Example II

| | Parts by weight |
|---|---|
| Resin (or mixture of resins) | 25 |
| Hardener | 15 |
| Filler (dry sand) | 80 |

Example III

| | Parts by weight |
|---|---|
| Resin (or mixture) | 25 |
| Hardener | 15 |
| Filler (dry sand) | 100 |

Either mix is prepared cold by thorough admixture of the sand and resin so that the sand is thoroughly wetted by the resin, without applying pressure, to produce a homogeneous mortar. The hardener is then added and thoroughly mixed with the mortar. The mixture is now ready for spreading over the faces of the wood bodies. If the resin mix is spread to a thickness of one-eighth of an inch over the body and chippings for the size defined above, i.e., $\frac{1}{4}''/\frac{3}{16}''$ then about eighty parts by weight of the chippings may be applied to the area covered by the mix, either of Example II or Example III.

During manufacture of the elements the optimum curing and treatment conditions are available in the factory. Furthermore, where each resin layer extends only over a comparatively small area, as in the case of a block, the resin is less likely to crack and then lift owing to the entry of water into the cracks. In any event any crack which might occur in any one layer is confined to that layer. The time lost while the resin is being cured is lost in the factory, whereas in the laying of a concrete road or the like the time for setting is lost on the site and the road, bridge or the like must be kept closed during this time. The elements according to the invention are prepared in the factory and are laid on the road or other foundation. Once elements like those shown in FIGURE 1 have been grouted into position, for example, with a bitumen grouting compound, the road or the like is ready for use.

The ease with which a surface can be paved with elements according to the invention will be readily appreciated. Elements like those shown in FIGURE 1 are laid using conventional techniques which are well known as applied to the laying of ordinary wood blocks, without any additional labour being involved.

Figure 4:
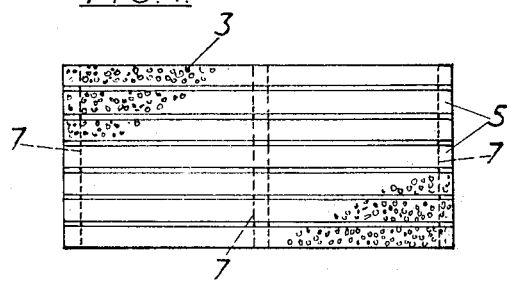
FIGURE 4 is a plan view of a wood paving element according to the invention made by securing a number of elements like that shown in FIGURE 3 to battens.

Elements such as those of FIGURES 3 and 4 are intended more particularly but not exclusively for railway crossings, factory floors and the like. They are laid edge to edge on, for example, a concrete or metal foundation. Where, for example, they are laid across railway tracks to provide crossings they may, at zones between the rails, rest on and be bolted to the railway sleepers. The paving elements are secured to the sleepers by bolts or other releasable means to permit removal of the elements for inspection of the track. Elements such as those shown in FIGURE 3, of appropriate thickness, may also be used as railway sleepers, the upper surfaces of the elements being unfaced where the chairs for the rails rest.

Figure 5:
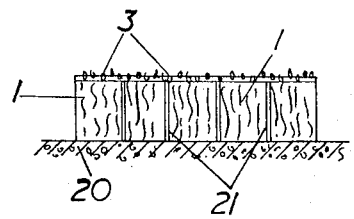
FIGURE 5 is an end elevation of part of a paved structure comprising a plurality of paving elements according to the invention.

A paved structure comprising a plurality of elements as shown in FIGURE 1 is shown in FIGURE 5. In this figure the said elements are laid side by side in spaced relation on a concrete foundation 20 and the spaces between the elements are filled with a bituminous grouting material 21.

Paving elements made as above described, have a high resistance to skidding and slipping and especially those comprising calcined bauxite chippings also have a high degree of resistance to polishing, chipping and breakage in use.

The following is a skid resistance test to which elements comprising calcined bauxite chippings were submitted.

A pendulum with a strip of rubber attached to its free end was allowed to travel across the surface of the material under test and the amount of rise after leaving the surface was measured on a scale. The resistance to the free swing of the pendulum gives the frictional loss and indicates the degree of skid resistance of the surface. The figure of 1.0 was taken as absolute resistance. Untreated wood blocks gave a reading of .35 to .40 and elements according to the invention comprising calcined bauxite chippings gave readings varying between .80 and .90.

The following test indicates the resistance to polishing (i.e., the removal of minute surface particles to leave a polished surface) and resistance to breakage of the bauxite chippings.

A machine which subjects surfaces to wear and polishing action by passing a wheel over them with a predetermined load and speed was used. A "polished stone coefficient" indicates the degree to which a stone will polish under wear and so become dangerous in promoting skidding. A figure of 1.0 indicates no polishing action whatever. The test elements gave a polished stone co-efficient of .65, as against the normal range obtained with conventional stone road-making materials of .35 to .55. There was no sign of any physical loosening or breaking out of the chippings from the resin layer.

I claim:

1. A paving element comprising a wood body part, said body part having a substantially plane face, a hard, strongly adhesive layer comprising cured hard synthetic epoxide resin adhered to said face and a quantity of stones comprising relatively spaced chippings of calcined bauxite embedded in the layer for substantially the full thickness thereof, the stones having a height greater than the thickness of the layer so that the upper part of each stone projects from the layer, the projecting parts of the relatively spaced stones and the top surface of the said layer defining intercommunicating channels.

2. A paving element comprising a wood body part, said body part having a substanitally plane face, a hard strongly adhesive layer comprising cured hard synthetic epoxide resin adhered to said face and a quantity of stones comprising relatively spaced chippings of calcined bauxite having a height approximately equal to twice the thickness of the layer embedded in the layer for substantially the full thickness thereof so that about half of each stone projects from the layer, the projecting parts of the relatively spaced stones and the top surface of the said layer defining intercommunicating channels.

3. A paving element according to claim 2 wherein the layer is approximately 3 mm. thick and the stones are of the size range ¼"/⅜".

4. A method of providing a face of a wood paving element with an anti-skid, protective, channelled wearing surface, which method comprises applying to said face a layer comprising a hardenable synthetic epoxide resin, embedding in relatively spaced relation in said layer for substantially the full thickness thereof stones comprising chippings of calcined bauxite, and curing the layer to the hardened condition, said chippings having a height greater than the thickness of said layer whereby the upper part of each chipping projects from the layer and the relatively spaced projecting parts of the chippings and the top surface of the layer define intercommunicating channels in said wearing surface.

5. A method according to claim 4 comprising selecting the stones to have a minimum dimension approximately double the depth of the layer, so that about one half of the surface of each stone is embedded in the layer.

6. A method according to claim 5 wherein said layer is applied to said face to a thickness of approximately 3 mm.

7. A method according to claim 4 comprising using a resin which has a viscosity of 4,000 to 15,000 centipoises, an average molecular weight of 350 to 400 and an epoxy equivalent of 175 to 210.

8. A method according to claim 4 comprising making up a mixture of resin 25 parts by weight, hardener 15 parts by weight and a filler of dry sand 80 parts by weight.

9. A method according to claim 4 comprising making up a mixture of resin 25 parts by weight, hardener 15 parts by weight and a filler of dry sand 100 parts by weight.

10. A method according to claim 6 wherein approximately 80 parts by weight of chippings of ¼"/³⁄₁₆" are applied to the hardenable resin layer.

References Cited by the Examiner
UNITED STATES PATENTS

| 146,931 | 1/1874 | McGowan | 94—11 |
| 1,953,337 | 4/1934 | Carson | 94—15 |
| 2,213,687 | 9/1940 | Brassert | 52—612 |
| 2,658,015 | 11/1953 | Williams | 154—132 |
| 2,943,953 | 7/1960 | Daniel | 117—43 |
| 2,951,001 | 8/1960 | Rubenstein | 154—45.9 |

FOREIGN PATENTS

| 834,147 | 5/1960 | Great Britain. |

CHARLES E. O'CONNELL, *Primary Examiner.*

N. C. BYERS, *Assistant Examiner.*